United States Patent
Nichols et al.

(10) Patent No.: US 6,422,376 B1
(45) Date of Patent: Jul. 23, 2002

(54) AUGER COUPLER

(75) Inventors: Dirk E. Nichols, Beloit; Jeffrey S. Hughes, Glen Elder, both of KS (US)

(73) Assignee: Sunflower Manufacturing Company, Inc., Beloit, KS (US)

( * ) Notice: Subject to any disclaimer, the term of this patent is extended or adjusted under 35 U.S.C. 154(b) by 82 days.

(21) Appl. No.: 09/686,544

(22) Filed: Oct. 11, 2000

(51) Int. Cl.⁷ ............................................ B65G 33/32
(52) U.S. Cl. ..................... 198/668; 198/632; 414/526
(58) Field of Search ........................... 198/668, 632, 198/666; 414/526

(56) References Cited

U.S. PATENT DOCUMENTS

| | | |
|---|---|---|
| 2,138,576 A | 11/1938 | Gebert et al. |
| 2,892,327 A | 6/1959 | Kressin |
| 3,241,657 A | 3/1966 | Buschbom |
| 3,337,068 A | 8/1967 | Meharry |
| 3,550,793 A | 12/1970 | Davidow et al. |
| 3,664,444 A * | 5/1972 | Henson ....................... 175/323 |
| 3,670,913 A | 6/1972 | Reaves |
| 3,717,272 A | 2/1973 | Chartier |
| 4,368,003 A | 1/1983 | MacDonald |
| 4,512,687 A | 4/1985 | Enns |
| 4,530,429 A | 7/1985 | Erickson |
| 4,613,275 A * | 9/1986 | Karlowsky ................... 414/489 |
| 4,621,968 A * | 11/1986 | Hutchison ................... 414/311 |
| 4,669,945 A * | 6/1987 | Pollard et al. ............... 414/505 |
| 4,821,818 A * | 4/1989 | Mefferd ....................... 175/323 |
| 4,846,621 A | 7/1989 | Warsaw |
| 5,013,208 A | 5/1991 | Grieshop |
| 5,100,281 A * | 3/1992 | Grieshop ..................... 414/526 |
| 5,253,746 A | 10/1993 | Friesen et al. |

OTHER PUBLICATIONS

Sales Literature of J. & M. Maufacturing Co., Inc., of Ft. Recovery, Iowa, for grain carts, exact publication date unknown, but believed to be at least one year prior to the filing of the present application.

Sales Literature of Kinze Manufacturing, Inc., of Williamsburg, Iowa, for auger wagons, exact publication date unknown, but believed to be at least one year prior to the filing of the present application.

Sales Literature of Parker Industries, a division of Top Air Manufacturing, Inc., of Jefferson, Iowa, for grain carts, exact publication date unknown, but believed to be at least one year prior to the filing of the present application.

* cited by examiner

*Primary Examiner*—Christopher P. Ellis
*Assistant Examiner*—Khoi H. Tran
(74) *Attorney, Agent, or Firm*—Shughart Thomson & Kilroy P.C.

(57) ABSTRACT

An auger coupler for a folding grain conveyor is disclosed which operates to connect an upper auger to a lower auger. A drive member adapted to be connected to the lower auger include a pilot shaft designed to help align the drive member with the driven member and an annular thrust bearing surface surrounding the pilot shaft. Spaced outwardly from the thrust bearing surface is an annular row of drive teeth. The drive teeth project axially upwardly from an annular base surface which is parallel to and concentric with the thrust bearing surface. A driven member adapted to be connected to the upper auger includes a receiver sized and shaped to accept the pilot shaft of the drive member. The receiver is also surrounded by an annular thrust bearing surface. Spaced radially outwardly from the thrust bearing surface is an annular row of driven teeth which are structurally identical to the drive teeth. The driven teeth project axially downwardly from a tooth base surface which is parallel to and concentric with the thrust bearing surface. When the coupler members are fully engaged the thrust bearing surfaces of the two members are in contact with each other. This contact between the thrust bearing surfaces holds the drive and driven teeth in spaced relation such that clearance gaps are formed between the extremities of the teeth of each member and the tooth base surface of the opposite member. These clearance gaps allow the coupler to engage despite an accumulation of debris, such as grain, on the coupler.

25 Claims, 3 Drawing Sheets

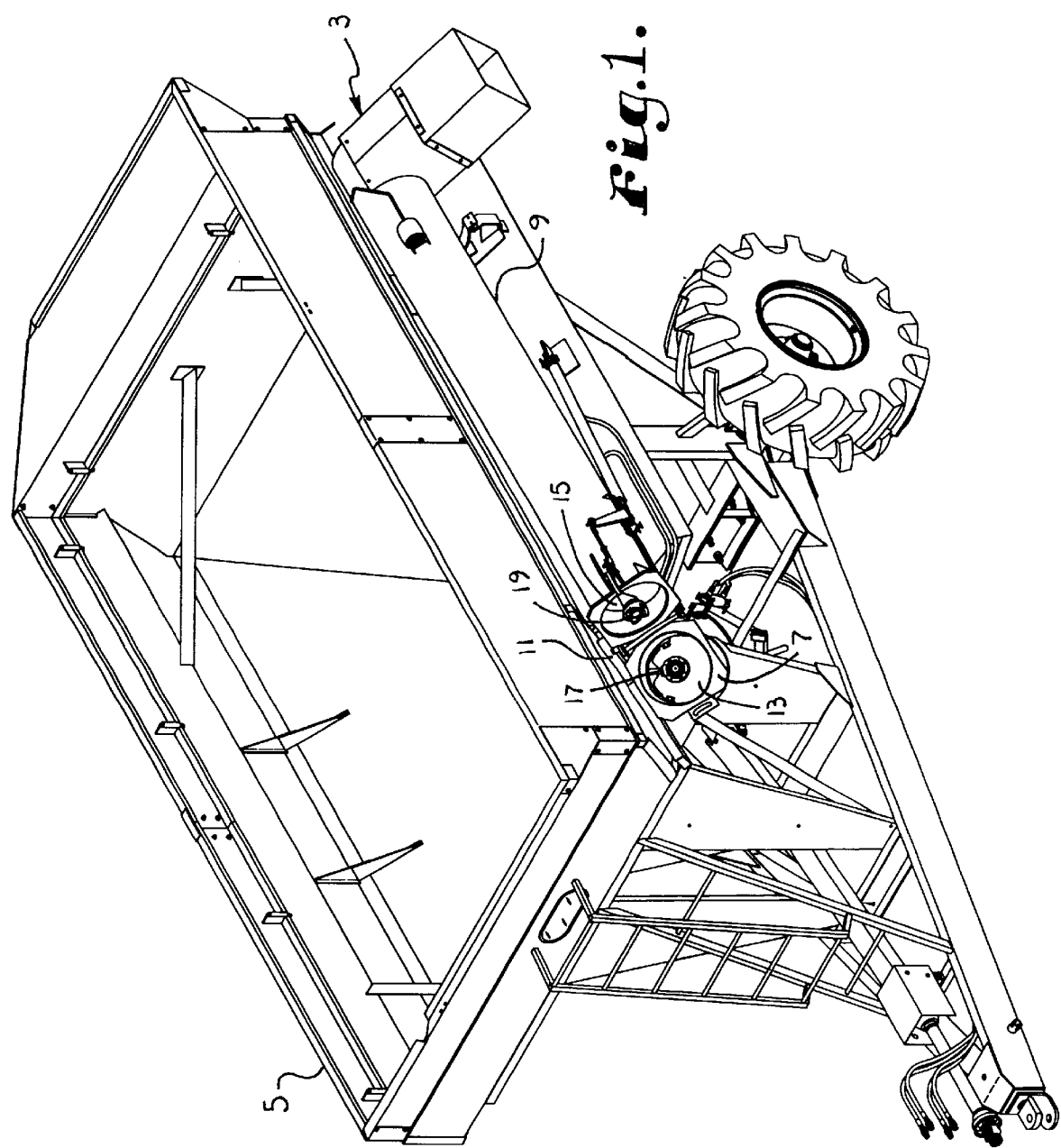

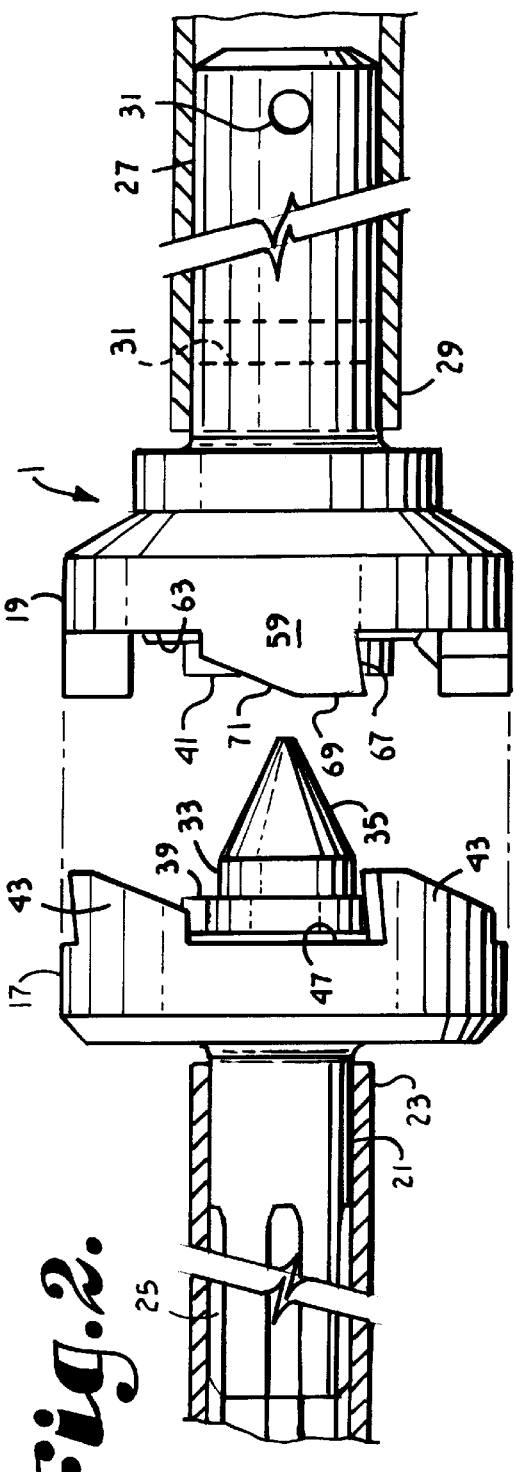

ns to couplers for joining upper and lower augers in folding grain conveyors as used on grain carts, combines, and other equipment used in the harvesting and transportation of grain.

AUGER COUPLER

BACKGROUND OF THE INVENTION

1. Field of the Invention

The present invention relates to the field of agricultural machinery, and more particularly to couplers for joining upper and lower augers in folding grain conveyors as used on grain carts, combines, and other equipment used in the harvesting and transportation of grain.

2. Description of the Related Art

Grain carts, combines, and other equipment used in the harvesting and transportation of grain often utilize an auger type grain conveyor for unloading the grain from an onboard bin or hopper and transferring it to another location, such as a truck or storage bin. Grain conveyors on mobile equipment often must be made so that they can fold for transport and then be extended for use. Folding conveyors generally have upper and lower sections pivotally connected by some type of hinge. The unfolding operation is often accomplished remotely by means of hydraulic actuators. Each joint where a conveyor folds requires the use of an auger coupler to join the upper auger to the lower augers.

In order to function properly, an auger coupler used in a folding conveyor must perform two functions; it must align the two augers and it must drive the upper auger by transferring rotational movement from the lower auger to the upper auger. The alignment function is generally performed by a centering pin or pilot shaft connected to one of the augers which engages a receiver in the other auger. The centering pin usually has a tapered or hemispherical end which helps guide the pin into the receiver as the conveyor unfolds. The drive function of the auger coupler can be performed in a wide variety of ways, but is generally accomplished by an arrangement of pins or teeth on the adjacent auger ends which interlock to transfer rotational movement from one auger to the other.

A very simple auger coupler is disclosed by U.S. Pat. No. 3,550,793 issued to Martin A. Davidow and assigned to the J. I. Case Company. This coupler is centered by an upper auger equipped with a tapered end which engages the hollow center tube of the lower section. The drive function is performed by a single longitudinally mounted pin mounted to the lower auger tube which engages a transversely mounted pin on the upper tube. A somewhat similar design is disclosed by U.S. Pat. No. 3,337,068 to J. L. Meharry which utilizes a longitudinally mounted pin on each auger to drive the upper auger. While having the advantage of simplicity, these designs would be prone to breakage or bending of the drive pins, resulting in failure of the conveyor.

An auger coupler which appears to be more durable is disclosed by U.S. Pat. No. 3,670,913 issued to Robert S. Reaves and assigned to the Allis-Chalmers Manufacturing Company. In this design the lower auger is equipped with a socket member having a central pilot shaft receiver and an internal drive flange. The upper auger includes a tapered pilot shaft which is encircled by a spiral-shaped driven flange. The drive flange and driven flange engage each other to drive the upper auger as the pilot shaft enters the receiver. One problem with this design is that grain or other debris could easily collect in the socket member and interfere with proper engagement of the coupler. Accumulation of debris in the coupler would necessitate the operator to manually clean out the coupler before the conveyor could be operated. This extra clean-out step would be time consuming and even potentially hazardous as it would expose the operators hands to the working parts of the auger.

It is apparent that there remains a need for a strong, durable auger coupler that is capable of engagement despite an accumulation of grain or debris on the components of the coupler.

SUMMARY OF THE INVENTION

The present invention comprises an auger coupler for a folding grain conveyor which operates to connect the upper auger to the lower auger. The coupler is specially adapted to work effectively despite an accumulation of grain or debris on the components of the auger coupler. The auger coupler has two parts; a lower or drive member which is secured to the lower auger and an upper or driven member which is secured to the upper auger.

The drive member includes an input shaft which is adapted to be connected to the lower auger. On an opposite end of the drive member from the input shaft is a pilot shaft having a tapered end or centering cone designed to help align the drive member with the driven member. The pilot shaft is in axial alignment with the input shaft. Surrounding the pilot shaft is an annular first thrust bearing surface. The thrust bearing surface engages a similar surface on the driven member and thereby controls the axial spacing between the two members. Spaced outwardly from the thrust bearing surface of the drive member is an annular row of drive teeth. The drive teeth project axially upwardly from an annular base surface which is parallel to and concentric with the thrust bearing surface. The drive teeth each have an engagement surface and a sloping alignment surface opposite the engagement surface.

The driven member includes an output shaft which is securable to the upper auger. On an opposite end of the driven member from the output shaft and in axial alignment with the output shaft is a receiver sized and shaped to accept the pilot shaft of the drive member. The receiver is surrounded by the driven member's thrust bearing surface. Spaced radially outwardly from the thrust bearing surface is an annular row of driven teeth which are structurally identical to the drive teeth. The driven teeth project axially downwardly from a tooth base surface which is parallel to and concentric with the thrust bearing surface.

As the conveyor is unfolded, bringing the upper and lower augers into axial alignment, the driven member comes into engagement with the drive member to transfer rotational movement from the lower auger to the upper auger. As the two coupler members come together, the tapered end of the pilot shaft guides the pilot shaft into the receiver, which axially aligns the driven member with the drive member. The alignment surfaces of the teeth help bring the teeth into proper orientation so that the tooth engagement surfaces of the drive and driven members can engage each other.

When the coupler members are fully engaged the thrust bearing surfaces of the two members are in contact with each other. This contact between the thrust bearing surfaces holds the drive and driven teeth in spaced relation along the axis of rotation, such that a first set of clearance gaps are formed between the lower extremities of the driven teeth and the drive tooth base surface and a second set of clearance gaps are formed between the upper extremities of the drive teeth and the driven tooth base surface. These first and second sets of clearance gaps allow the coupler driven member to engage the coupler drive member despite an accumulation of grain or debris on either of the coupler members.

The auger coupler also includes an automatic clean-out feature. Any grain or debris which has collected in the clearance gaps will be spun out of the clearance gaps when the coupler begin to rotate. In addition, the clearance gaps communicate with the annular space left between the rows of teeth and the outside edges of the thrust bearing surfaces, allowing any grain or debris which has accumulated in the annular space to be spun out as well.

OBJECTS AND ADVANTAGES OF THE INVENTION

The principal objects and advantages of the present invention include: providing an auger coupler for joining upper and lower augers of a folding grain conveyor; providing such an auger coupler which is capable of transferring rotational movement from the lower auger to the upper auger; providing such an auger coupler which will engage despite an accumulation of grain or debris on the auger coupler; providing such an auger coupler which has an automatic clean out feature; providing such an auger coupler which is strong and well balanced; and providing such an auger coupler which is economical to manufacture, efficient in operation, capable of long operating life and particularly well-adapted for the proposed usage thereof.

BRIEF DESCRIPTION OF THE DRAWINGS

FIG. 1 is a perspective view of a grain cart having a folding grain conveyor including an auger coupler embodying the present invention.

FIG. 2 is an exploded view of the auger coupler and the adjacent auger shafts.

FIG. 3 is an end view of the coupler drive member.

FIG. 5 is a partial side view of the auger coupler with the drive member and driven member fully engaged.

DETAILED DESCRIPTION OF THE PREFERRED EMBODIMENT

Figure 4:
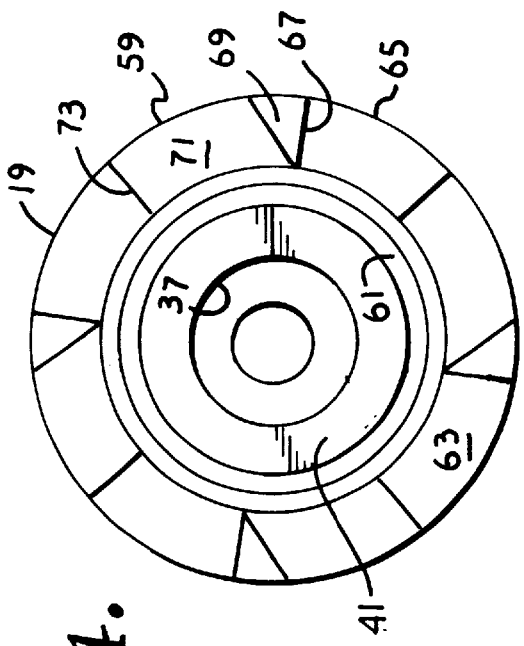
FIG. 4 is an end view of the coupler driven member.
Figure 6:
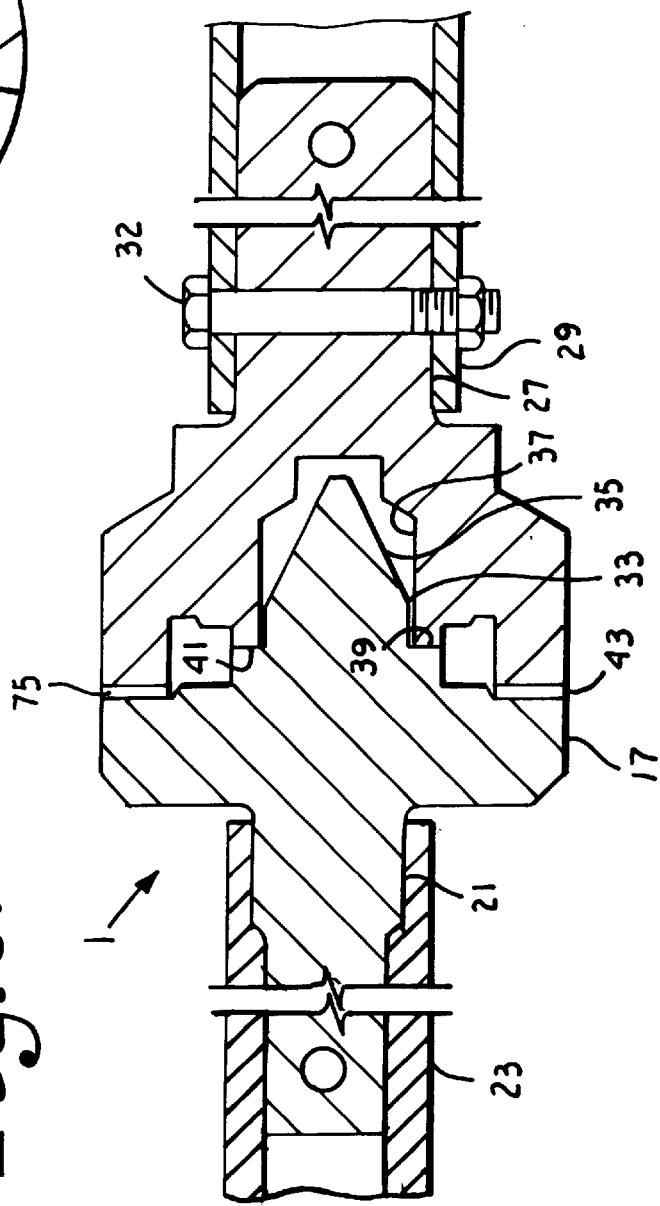
FIG. 6 is a partial cross-sectional view of the auger coupler taken generally along line 6—6 in FIG. 5.

As required, detailed embodiments of the present invention are disclosed herein, however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Certain terminology will be used in the following description for convenience in reference only and will not be limiting. For example, the words "upwardly," "downwardly," "rightwardly," and "leftwardly" will refer to directions in the drawings to which reference is made. The words "inwardly" and "outwardly" will refer to directions toward and away from, respectively, the geometric center of the embodiment being described and designated parts thereof Said terminology will include the words specifically mentioned, derivatives thereof and words of a similar import.

Referring to the drawings in more detail, the reference number 1 generally designates an auger coupler embodying the present invention. The auger coupler 1 is designed as a component part of a folding grain conveyor 3 which is shown as being part of a grain cart 5, however such folding grain conveyors are also utilized on combines and other equipment used in the harvesting, transportation, and storage of grain. The grain conveyor 3 has a lower conveyor section 7 which is hingedly connected to an upper conveyor section 9 by a hinge 11. The lower and upper conveyor sections 7 and 9 include lower and upper augers 13 and 15 respectively. The auger coupler 1 functions to join the lower auger 13 to the upper auger 15 and to drive the upper auger 15 by transmitting rotational movement from the lower auger 13 to the upper auger 15.

The coupler 1 includes a lower coupler member or drive member 17 and an upper coupler member or driven member 19. The lower coupler member 17 includes an input shaft 21 which is adapted to engage a lower auger shaft 23 of the lower auger 13. The input shaft 21 is shown as having longitudinal external splines 25 which are adapted to engage corresponding internal splines on the lower auger shaft 23, however, the input shaft 21 may be joined to the lower auger 13 in any known manner. Similarly, the upper coupler member 19 includes an output shaft 27 adapted to engage an upper auger shaft 29 of the upper auger 15. The output shaft 27 is shown as having a pair of transverse receivers 31 adapted to accept bolts or pins 32 for securing the output shaft 27 to the upper auger shaft 29. As with the input shaft 21, however, the method of joining the output shaft 27 to the upper auger 15 is not critical to the invention and can be accomplished in a wide variety of known methods. The input and output shafts 21 and 27 could also be integral parts of the lower and upper auger shafts 23 and 29, respectively.

The lower coupler member 17 is equipped with a centrally located pilot shaft, locating pin, or centering pin 33 which includes a tapered end section or centering cone 35. The upper coupler member 19 includes a central pilot shaft receiver, locating pin receiver, or centering pin receiver 37 which is sized and shaped to accept the pilot shaft 33 of the lower coupler member 17. The centering cone 35 helps align the pilot shaft 33 with the pilot shaft receiver 37 as the upper coupler member 19 is brought into engagement with the lower coupler member 17 by the unfolding of the upper auger 15 relative to the lower auger 13. It should be noted that the locations of the pilot shaft 33 and pilot shaft receiver 37 could be reversed, i.e. the pilot shaft 33 could be located on the upper coupler member 19 and engage a receiver 37 in the lower coupler member 17, however this orientation would be less advantageous because grain, chaff, and other debris would tend to collect in the receiver 37 and inhibit engagement of the coupler 1.

The lower coupler member 17 further includes an annular thrust bearing surface 39 which is located immediately radially outward from the pilot shaft 33 and oriented perpendicularly thereto. A mating annular thrust bearing surface 41 is located on the upper coupler member 19 immediately radially outward from the pilot shaft receiver 37. Thrust bearing surfaces 39 and 41 slidingly engage each other when the lower coupler member 17 and upper coupler member 19 are in full engagement.

The lower coupler member 17 includes an annular ring of drive teeth 43, the ring being spaced outwardly from the outer edge of the thrust bearing surface 39 so as to define an annular gap or space 45 therebetween. The drive teeth 43 project upwardly from an annular drive tooth base surface 47 which is spaced downwardly from the thrust bearing surface 39. The drive teeth 43 are oriented in spaced relation to each other such that there are gaps 49 between adjacent teeth 43.

Each drive tooth 43 has a leading or engaging surface 51, a top surface 53, a sloping alignment surface 55, and a trailing surface 57. The engaging surfaces 51 of the teeth 43 are preferably oriented at an angle of somewhat less than ninety degrees to the drive tooth base surface 47 so that the teeth 43 will have some backlash. This backlash helps prevent the lower coupler member 17 from separating from the upper coupler member 19 under load. The top surface 53 is oriented parallel to the drive tooth base surface 47 and has a generally triangular configuration. The alignment surface 55 slopes downwardly from the top surface 53 to the trailing surface 57, which is oriented perpendicularly to the drive tooth base surface 47.

The upper coupler member 19 includes an annular ring of driven teeth 59 which are structurally identical to the drive teeth 43. The ring is spaced outwardly from the outer edge of the thrust bearing surface 41 so as to define an annular gap 61 therebetween. The driven teeth 59 project downwardly from an annular driven tooth base surface 63 which is spaced upwardly from the thrust bearing surface 41. The driven teeth 59 are oriented in spaced relation to each other such that there are gaps 65 between adjacent teeth 59.

Each driven tooth 59 has a trailing or engaging surface 67, a bottom surface 69, a sloping alignment surface 71, and a leading surface 73. The engaging surfaces 67 of the teeth 59 are oriented at an angle to the driven tooth base surface 63 such that the backlash angle of the teeth 59 is equal to that of the drive teeth 43. The bottom surface 69 is oriented parallel to the driven tooth base surface 63 and has a generally triangular configuration. The alignment surface 71 slopes upwardly from the bottom surface 69 to the leading surface 73, which is oriented perpendicularly to the driven tooth base surface 63.

The coupler 1 is depicted herein as having four drive teeth 43 and four driven teeth 59, however more or fewer teeth 43 and 59 could be used within the scope of the present invention. It is preferable that the number of drive teeth 43 be equal to the number of driven teeth 59 because this arrangement produces the strongest and most well balanced coupler 1, however it is not essential that the numbers of teeth be equal, so long as the spacing between the teeth is such that the coupler members 17 and 19 will mate up.

The lower coupler member 17 and the upper coupler member 19 cooperate with each other so as to easily mate up as the conveyor sections 7 and 9 are brought into alignment with each other by the unfolding of the hinge 11. As the upper coupler member 19 pivots toward the lower coupler member 17, the point of the centering cone 35 is pushed into the pilot shaft receiver 37, and the sloping sides of the centering cone 35 guide the pilot shaft 33 into alignment with the pilot shaft receiver 37. As the pilot shaft 33 slides into the pilot shaft receiver 37, the drive teeth 43 and driven teeth 59 start to come together. If the drive teeth 43 and driven teeth 59 are not perfectly aligned with the respective gaps 65 and 49, the sloping alignment surfaces 55 and 71 will make contact with each other, and the sloping shape of the alignment surfaces 55 and 71 will guide the teeth 43 and 59 into proper alignment. Once the teeth 43 and 59 are aligned, the thrust bearing surfaces 39 and 41 are free to come together, completing the coupling process.

When power is applied to the lower auger 13, the lower coupler member 17 will begin to rotate, and this rotation will bring the engagement surfaces 51 of the drive teeth 43 into contact with the engagement surfaces 67 of the driven teeth 59. This contact between the engagement surfaces 51 and 67 will transfer power through the upper coupler member 19 to the upper auger 15, causing it to rotate with the lower auger 13.

The coupler 1 is specially designed so that the lower and upper coupler members 17 and 19 will engage properly even if grain, straw, chaff, dirt, mud, or other debris has accumulated on the coupler members 17 and 19, such as while the conveyor 3 is folded. The tooth base surfaces 47 and 63 are in an axially spaced relationship with the thrust bearing surfaces 39 and 41 such that when the thrust bearing surfaces 39 and 41 are in engagement with each other, a first clearance gap 75 is left between each driven tooth bottom surface 69 and the drive tooth base surface 47 and a second clearance gap 77 is left between each drive tooth top surface 53 and the driven tooth base surface 63. These clearance gaps 75 and 77 provide a space in which grain or other debris can accumulate without preventing engagement of the coupler members 17 and 19. In addition, the pilot shaft receiver 37 contains sufficient space to allow for the accumulation of some debris between the internal walls of the receiver 37 and the centering cone 35 without the debris interfering with the function of the coupler 1.

The coupler 1 is also designed to have an automatic clean-out feature. Any grain or debris which has accumulated in the clearance gaps 75 and 77 will be spun out of the clearance gaps 75 and 77 by centrifugal force when the augers 13 and 15 begin to rotate. In addition, when the conveyor 3 is running and the engagement surfaces 51 of the drive teeth 43 are in contact with the engagement surfaces 67 of the driven teeth 59, sloping gaps 79 are left between the alignment surfaces 55 of the drive teeth 43 and the alignment surfaces 71 of the driven teeth 59. The gaps 75, 77, and 79 all communicate the annular space formed by the combination of the annular gaps 45 and 61 between the outer edge of the thrust bearing surfaces 39 and 41 and the inner edges of the teeth 43 and 59 to the outer circumference of the coupler 1. Any grain or debris which has accumulated in the annular gaps 45 and 61 will be spun out through the gaps 75, 77, and 79 by centrifugal force when the augers 13 and 15 begin to rotate.

It is to be understood that while certain forms of the present invention have been illustrated and described herein, it is not to be limited to the specific forms or arrangement of parts described and shown.

What is claimed and desired to be secured by Letters Patent is as follows:

1. An auger coupler for a folding grain conveyor having first and second conveyor sections connected by a hinge, the first and second conveyor sections including respective first and second augers, the first and second augers having respective first and second auger shafts, said auger coupler operating to connect the first auger to the second auger upon unfolding of the conveyor along the hinge, said auger coupler comprising:

a) a coupler drive member including a pilot shaft, said coupler drive member being securable to a distal end of the first auger such that said pilot shaft extends in axial alignment with the first auger shaft and outwardly therefrom, said coupler drive member further including:
 i) an annular first thrust bearing surface located immediately radially outward from and perpendicular to said pilot shaft,
 ii) an annular drive tooth base surface parallel to and concentric with said first thrust bearing surface; and
 iii) a plurality of drive teeth arranged in an annular row and projecting axially away from said drive tooth base surface to a drive tooth extremity; and b) a coupler driven member including a pilot shaft receiver, said coupler driven member being securable to a proximate end of the second auger such that said pilot shaft receiver extends in axial alignment with the second auger shaft and outwardly therefrom, said coupler driven member further including:
  i) a second annular thrust bearing surface located immediately radially outward from and perpendicular to said pilot shaft receiver,
  ii) an annular driven tooth base surface parallel to and concentric with said second thrust bearing surface; and
  iii) a plurality of driven teeth arranged in an annular row and projecting axially away from said driven tooth base surface to a driven tooth extremity; and wherein
c) said coupler driven member is engagable with said coupler drive member to transfer rotational movement from the first auger to the second auger; and when so engaged:
  i) said pilot shaft receiver accepts said pilot shaft;
  ii) said second thrust bearing surface engages said first thrust bearing surface;
  iii) said driven teeth engage said drive teeth;
  iv) a first set of clearance gaps are formed between said driven tooth extremities and said drive tooth base surface; and
  v) a second set of clearance gaps are formed between said drive tooth extremities and said driven tooth base surface.

2. The auger coupler as in claim 1 wherein said first and second sets of clearance gaps communicate with an outside surface of said auger coupler.

3. The auger coupler as in claim 2 wherein:
a) said first thrust bearing surface has an outer edge and each said drive tooth has an inner edge spaced radially outwardly from said first thrust bearing outer edge forming a first annular space therebetween; and
b) said second thrust bearing surface has an outer edge and each said driven tooth has an inner edge spaced radially outwardly from said second thrust bearing outer edge forming a second annular space therebetween.

4. The auger coupler as in claim 3, wherein said first and second annular spaces communicate with said first and second sets of clearance gaps.

5. The auger coupler as in claim 3 wherein:
a) each said drive tooth includes an engaging surface and an alignment surface opposite said engaging surface, said alignment surface sloping inwardly from said drive tooth extremity toward said drive tooth base surface;
b) each said driven tooth includes an engaging surface and an alignment surface opposite said engaging surface, said alignment surface sloping inwardly from said driven tooth extremity toward said driven tooth base surface; and
c) a sloping gap is formed between each said drive tooth alignment surface and the adjacent driven tooth alignment surface when said drive tooth engaging surfaces are engaged with said driven tooth engaging surfaces, said sloping gaps communicating with an outside surface of said coupler.

6. The auger coupler as in claim 5 wherein said first and second annular spaces communicate with said sloping gaps.

7. The auger coupler as in claim 1 wherein each said drive tooth and driven tooth has an engagement surface which is oriented at an angle of less than ninety degrees with respect to said drive tooth or driven tooth base surface respectively.

8. The auger coupler as in claim 1 wherein:
a) each said drive tooth includes an engaging surface and an alignment surface opposite said engaging surface, said alignment surface sloping inwardly from said drive tooth extremity toward said drive tooth base surface;
b) each said driven tooth includes an engaging surface and an alignment surface opposite said engaging surface, said alignment surface sloping inwardly from said driven tooth extremity toward said driven tooth base surface; and
c) said driven tooth alignment surfaces slidingly engage said drive tooth alignment surfaces as the conveyor unfolds along the hinge to bring said driven teeth into engagement with said drive teeth.

9. An auger coupler for a folding grain conveyor having first and second conveyor sections connected by a hinge, the first and second conveyor sections including respective first and second augers, the first and second augers having respective first and second auger shafts, said auger coupler operating to connect the first auger to the second auger upon unfolding of the conveyor along the hinge, said auger coupler comprising:
a) a coupler drive member including a pilot shaft receiver, said coupler drive member being securable to a distal end of the first auger such that said pilot shaft receiver extends in axial alignment with the first auger shaft and outwardly therefrom, said coupler drive member further including:
  i) an annular first thrust bearing surface located immediately radially outward from and perpendicular to said pilot shaft receiver;
  ii) an annular drive tooth base surface parallel to and concentric with said first thrust bearing surface; and
  iii) a plurality of drive teeth arranged in an annular row and projecting axially away from said drive tooth base surface to a drive tooth extremity; and
b) a coupler driven member including a pilot shaft, said coupler driven member being securable to a proximate end of the second auger such that said pilot shaft extends in axial alignment with the second auger shaft and outwardly therefrom, said coupler driven member further including:
  i) a second annular thrust bearing surface located immediately radially outward from and perpendicular to said pilot shaft;
  ii) an annular driven tooth base surface parallel to and concentric with said second thrust bearing surface; and
  iii) a plurality of driven teeth arranged in an annular row and projecting axially away from said driven tooth base surface to a driven tooth extremity; and wherein
c) said coupler driven member is engagable with said coupler drive member to transfer rotational movement from the first auger to the second auger; and when so engaged:
  i) said pilot shaft receiver accepts said pilot shaft;
  ii) said second thrust bearing surface engages said first thrust bearing surface;
  iii) said driven teeth engage said drive teeth;
  iv) a first set of clearance gaps are formed between said driven tooth extremities and said drive tooth base surface; and
  v) a second set of clearance gaps are formed between said drive tooth extremities and said driven tooth base surface.

10. The auger coupler as in claim 9 wherein said first and second sets of clearance gaps communicate with an outside surface of said auger coupler.

11. The auger coupler as in claim 10 wherein:
a) said first thrust bearing surface has an outer edge and each said drive tooth has an inner edge spaced radially outwardly from said first thrust bearing outer edge forming a first annular space therebetween; and
b) said second thrust bearing surface has an outer edge and each said driven tooth has an inner edge spaced radially outwardly from said second thrust bearing outer edge forming a second annular space therebetween.

12. The auger coupler as in claim 11 wherein said first and second annular spaces communicate with said first and second sets of clearance gaps.

13. The auger coupler as in claim 11 wherein:
a) each said drive tooth includes an engaging surface and an alignment surface opposite said engaging surface, said alignment surface sloping inwardly from said drive tooth extremity toward said drive tooth base surface;
b) each said driven tooth includes an engaging surface and an alignment surface opposite said engaging surface, said alignment surface sloping inwardly from said driven tooth extremity toward said driven tooth base surface; and
c) a sloping gap is formed between each said drive tooth alignment surface and the adjacent driven tooth alignment surface when said drive tooth engaging surfaces are engaged with said driven tooth engaging surfaces, said sloping gaps communicating with an outside surface of said coupler.

14. The auger coupler as in claim 13 wherein said first and second annular spaces communicate with said sloping gaps.

15. The auger coupler as in claim 9 wherein each said drive tooth and driven tooth has an engagement surface which is oriented at an angle of less than ninety degrees with respect to said drive tooth or driven tooth base surface respectively.

16. The auger coupler as in claim 9 wherein:
a) each said drive tooth includes an engaging surface and an alignment surface opposite said engaging surface, said alignment surface sloping inwardly from said drive tooth extremity toward said drive tooth base surface;
b) each said driven tooth includes an engaging surface and an alignment surface opposite said engaging surface, said alignment surface sloping inwardly from said driven tooth extremity toward said driven tooth base surface; and
c) said driven tooth alignment surfaces slidingly engage said drive tooth alignment surfaces as the conveyor unfolds along the hinge to bring said driven teeth into engagement with said drive teeth.

17. An auger coupler for a folding grain conveyor having upper and lower conveyor sections connected by a hinge, the upper and lower conveyor sections including respective upper and lower augers, the upper and lower augers having respective upper and lower auger shafts, said auger coupler operating to connect the upper auger to the lower auger upon unfolding of the conveyor along the hinge despite an accumulation of debris on said auger coupler, said auger coupler comprising:
a) a coupler drive member including a pilot shaft, said coupler drive member being securable to a distal end of the lower auger such that said pilot shaft extends in axial alignment with the lower auger shaft and axially upwardly therefrom, said coupler drive member further including:
i) an annular first thrust bearing surface located immediately radially outward from and perpendicular to said pilot shaft, said first thrust bearing surface having an outer edge;
ii) an annular drive tooth base surface parallel to and concentric with said first thrust bearing surface; and
iii) a plurality of drive teeth arranged in an annular row and projecting axially upward from said drive tooth base surface to a drive tooth upper extremity, each said drive tooth having an inner edge spaced radially outwardly from said first thrust bearing outer edge such that a first annular space is formed between said first thrust bearing surface outer edge and said annular row of drive teeth; and
b) a coupler driven member including a pilot shaft receiver, said coupler driven member being securable to a proximate end of the upper auger such that said pilot shaft receiver extends in axial alignment with the upper auger shaft and axially downwardly therefrom, said coupler driven member further including:
i) a second annular thrust bearing surface located immediately radially outward from and perpendicular to said pilot shaft receiver, said second thrust bearing surface having an outer edge;
ii) an annular driven tooth base surface parallel to and concentric with said second thrust bearing surface; and
iii) a plurality of driven teeth arranged in an annular row and projecting axially downward from said driven tooth base surface to a driven tooth lower extremity, each said driven tooth having an inner edge spaced radially outwardly from said second thrust bearing outer edge such that a second annular space is formed between said second thrust bearing surface outer edge and said annular row of driven teeth; and wherein
c) said coupler driven member is engagable with said coupler drive member to transfer rotational movement from the lower auger to the upper auger; and when so engaged:
i) said pilot shaft receiver accepts said pilot shaft;
ii) said second thrust bearing surface engages said first thrust bearing surface;
iii) said driven teeth engage said drive teeth;
iv) a first set of clearance gaps are formed between said driven tooth lower extremities and said drive tooth base surface; and
v) a second set of clearance gaps are formed between said drive tooth upper extremities and said driven tooth base surface; and
d) said first and second sets of clearance gaps allow said coupler driven member to engage said coupler drive member despite the accumulation of debris on said coupler drive and/or driven members.

18. The auger coupler as in claim 17 wherein said first and second sets of clearance gaps communicate with an outside surface of said auger coupler such that any debris in said clearance gaps will be spun out of said clearance gaps by centrifugal force when said auger coupler begins to rotate.

19. The auger coupler as in claim 18 wherein said first and second annular spaces communicate with said first and second clearance gaps such that any debris in said annular spaces will be spun out of said annular spaces through said clearance gaps by centrifugal force when said auger coupler begins to rotate.

20. The auger coupler as in claim 19 wherein:
a) each said drive tooth includes an engaging surface and an alignment surface opposite said engaging surface, said alignment surface sloping downwardly from said drive tooth upper extremity toward said drive tooth base surface;

b) each said driven tooth includes an engaging surface and an alignment surface opposite said engaging surface, said alignment surface sloping upwardly from said driven tooth lower extremity toward said driven tooth base surface; and c) a sloping gap is formed between each said drive tooth alignment surface and the adjacent driven tooth alignment surface when said drive tooth engaging surfaces are engaged with said driven tooth engaging surfaces, said sloping gaps communicating with an outside surface of said coupler.

21. The auger coupler as in claim 20 wherein said first and second annular spaces communicate with said sloping gaps such that any debris in said annular spaces will be spun out of said annular spaces through said sloping gaps and said first and second clearance gaps by centrifugal force when said auger coupler begins to rotate.

22. The auger coupler as in claim 17 wherein each said drive tooth and driven tooth has an engagement surface which is oriented at an angle of less than ninety degrees with respect to said drive tooth or driven tooth base surface respectively.

23. The auger coupler as in claim 17 wherein:

a) each said drive tooth includes an engaging surface and an alignment surface opposite said engaging surface, said alignment surface sloping downwardly from said drive tooth upper extremity toward said drive tooth base surface;

b) each said driven tooth includes an engaging surface and an alignment surface opposite said engaging surface, said alignment surface sloping upwardly from said driven tooth lower extremity toward said driven tooth base surface; and c) said driven tooth alignment surfaces slidingly engage said drive tooth alignment surfaces as the conveyor unfolds along the hinge to bring said driven teeth into engagement with said drive teeth.

24. An auger coupler for a folding grain conveyor having upper and lower conveyor sections connected by a hinge, the upper and lower conveyor sections including respective upper and lower augers, said auger coupler operating to connect the upper auger to the lower auger upon unfolding of the conveyor along the hinge despite an accumulation of debris on said auger coupler, said auger coupler comprising:

a) a coupler drive member including:
  i) an input shaft securable to the lower auger;
  ii) a pilot shaft having a distal end opposite said input shaft, said pilot shaft being in axial alignment with said input shaft;
  iii) an annular first thrust bearing surface located immediately radially outward from and perpendicular to said pilot shaft, said first thrust bearing surface having an outer edge;
  iv) an annular drive tooth base surface parallel to and concentric with said first thrust bearing surface; and
  v) a plurality of drive teeth arranged in an annular row and projecting axially upward from said drive tooth base surface to a drive tooth upper extremity, each said drive tooth having an inner edge spaced radially outwardly from said first thrust bearing outer edge such that a first annular space is formed between said first thrust bearing surface outer edge and said annular row of drive teeth, each said drive tooth including an engaging surface and an alignment surface opposite said engaging surface, said alignment surface sloping downwardly from said drive tooth upper extremity toward said drive tooth base surface; and b) a coupler driven member including:
  i) an output shaft securable to the upper auger;
  ii) a pilot shaft receiver opposite said output shaft, said pilot shaft receiver being in axial alignment with said output shaft;
  iii) a second annular thrust bearing surface located immediately radially outward from and perpendicular to said pilot shaft receiver, said second thrust bearing surface having an outer edge;
  iv) an annular driven tooth base surface parallel to and concentric with said second thrust bearing surface; and
  v) a plurality of driven teeth arranged in an annular row and projecting axially downward from said driven tooth base surface to a driven tooth lower extremity, each said driven tooth having an inner edge spaced radially outwardly from said second thrust bearing outer edge such that a second annular space is formed between said second thrust bearing surface outer edge and said annular row of driven teeth, each said driven tooth including an engaging surface and an alignment surface opposite said engaging surface, said alignment surface sloping upwardly from said driven tooth lower extremity toward said driven tooth base surface; and wherein c) said coupler driven member is engagable with said coupler drive member to transfer rotational movement from the lower auger to the upper auger; and when so engaged:
  i) said pilot shaft receiver accepts said pilot shaft;
  ii) said second thrust bearing surface engages said first thrust bearing surface;
  iii) said driven tooth engaging surfaces engage said drive tooth engaging surfaces;
  iv) a first set of clearance gaps are formed between said driven tooth lower extremities and said drive tooth base surface;
  v) a second set of clearance gaps are formed between said drive tooth upper extremities and said driven tooth base surface;
  vi) a sloping gap is formed between each said drive tooth alignment surface and the adjacent driven tooth alignment surface,
  vii) said sloping gaps and said first and second sets of clearance gaps communicate with an outside surface of said auger coupler such that any debris in said gaps will be spun out of said gaps by centrifugal force when said auger coupler begins to rotate; and
  viii) said first and second annular spaces communicate with said sloping gaps and said first and second sets of clearance gaps such that any debris in said annular spaces will be spun out of said annular spaces through said sloping gaps and said clearance gaps by centrifugal force when said auger coupler begins to rotate; and d) said first and second sets of clearance gaps allow said coupler driven member to engage said coupler drive member despite the accumulation of debris on said coupler drive and/or driven members.

25. The auger coupler as in claim 18 wherein each said drive tooth and driven tooth has an engagement surface which is oriented at an angle of less than ninety degrees with respect to said drive tooth or driven tooth base surface respectively.

* * * * *